(12) United States Patent
Vedy

(10) Patent No.: US 8,860,267 B2
(45) Date of Patent: Oct. 14, 2014

(54) CONNECTOR FLANGE FOR AN ELECTRIC MACHINE WITH STATOR WINDINGS

(75) Inventor: Bertrand Vedy, La Tour de Peilz (CH)

(73) Assignees: Compagnie Generale des Etablissements Michelin, Clermont-Ferrand (FR); Michelin Recherche et Technique S.A., Granges-Paccot (CH)

(*) Notice: Subject to any disclaimer, the term of this patent is extended or adjusted under 35 U.S.C. 154(b) by 661 days.

(21) Appl. No.: 13/061,785

(22) PCT Filed: Sep. 2, 2009

(86) PCT No.: PCT/EP2009/061336
§ 371 (c)(1),
(2), (4) Date: May 10, 2011

(87) PCT Pub. No.: WO2010/026157
PCT Pub. Date: Mar. 11, 2010

(65) Prior Publication Data
US 2011/0221290 A1    Sep. 15, 2011

(30) Foreign Application Priority Data

Sep. 3, 2008    (FR) ...................................... 08 55897

(51) Int. Cl.
  H02K 5/22     (2006.01)
  H02K 5/173    (2006.01)
  H02K 5/06     (2006.01)
  H02K 11/00    (2006.01)

(52) U.S. Cl.
CPC .............. *H02K 5/225* (2013.01); *H02K 5/1732* (2013.01); *H02K 5/06* (2013.01); *H02K 11/0031* (2013.01)

USPC .............................................. 310/71; 310/89

(58) Field of Classification Search
USPC ................... 310/71, 400–401, 405, 410, 413, 310/416–417
IPC ............................................... H02K 5/04,5/173
See application file for complete search history.

(56) References Cited

U.S. PATENT DOCUMENTS

| | | |
|---|---|---|
| 3,267,399 A | 8/1966 | Spieker et al. |
| 3,939,372 A | 2/1976 | Wurst et al. ................... 310/168 |

(Continued)

FOREIGN PATENT DOCUMENTS

| | | |
|---|---|---|
| DE | 1 488 023 A1 | 5/1969 |
| DE | 1 613 298 A1 | 12/1970 |

(Continued)

*Primary Examiner* — Burton Mullins
(74) *Attorney, Agent, or Firm* — Fitzpatrick, Cella, Harper & Scinto

(57) ABSTRACT

An electric machine includes a stator magnetic circuit and a rotor. The magnetic circuit includes electrical conductors, which form windings of the machine. Coils formed by the windings are connected to an external unit via connection conductors, which open into an end face of the magnetic circuit. A frame sleeve envelopes the magnetic circuit and, on an output side of the connection conductors, the sleeve is extended by a lateral wall of a lid, which is pierced with a lateral exit opening through which the connection conductors can exit towards an external connector. On assembly, the connection conductors exiting the stator can be directly inserted into the exit opening of the lid before the lid is fixed to the sleeve by passing into a space provided between an internal lateral wall of the lid and a flange element of the lid.

14 Claims, 3 Drawing Sheets

(56) References Cited

U.S. PATENT DOCUMENTS

| | | | |
|---|---|---|---|
| 4,908,347 A | 3/1990 | Denk | 505/1 |
| 4,950,438 A | 8/1990 | Nakamura et al. | 264/272.2 |
| 5,142,182 A | 8/1992 | Grant | 310/270 |
| 5,554,900 A | 9/1996 | Pop, Sr. | 310/156 |
| 5,767,596 A * | 6/1998 | Stark et al. | 310/89 |
| 5,936,397 A | 8/1999 | Benkert et al. | 324/173 |
| 6,646,571 B1 | 11/2003 | Soar et al. | 341/13 |
| 6,657,356 B2 | 12/2003 | Laurent et al. | 310/254 |
| 6,750,574 B2 * | 6/2004 | Okazaki et al. | 310/68 B |
| 6,756,710 B2 * | 6/2004 | Bourqui et al. | 310/44 |
| 6,943,479 B2 * | 9/2005 | Laurent et al. | 310/412 |
| 7,911,095 B2 * | 3/2011 | Shu et al. | 310/74 |
| 2002/0175574 A1 * | 11/2002 | Okazaki et al. | 310/68 B |
| 2004/0090132 A1 | 5/2004 | Utsumi et al. | 310/68 B |
| 2004/0232873 A1 | 11/2004 | Heizmann et al. | 318/653 |
| 2005/0206253 A1 | 9/2005 | Hertz et al. | 310/68 B |
| 2006/0125439 A1 | 6/2006 | Ajima et al. | 318/716 |
| 2006/0226719 A1 | 10/2006 | Nakanishi et al. | 310/68 |
| 2007/0137373 A1 | 6/2007 | Hoefer et al. | 74/490.04 |
| 2007/0205679 A1 | 9/2007 | Terauchi et al. | 310/71 |
| 2007/0210661 A1 | 9/2007 | Schmidt et al. | 310/90 |
| 2007/0241625 A1 | 10/2007 | Terauchi | 310/68 B |
| 2007/0278875 A1 | 12/2007 | Haga et al. | 310/71 |
| 2008/0005888 A1 | 1/2008 | Bourqui et al. | 29/596 |
| 2009/0052209 A1 | 2/2009 | Kaitani et al. | 363/37 |

FOREIGN PATENT DOCUMENTS

| | | |
|---|---|---|
| DE | 195 46 595 A1 | 6/1997 |
| DE | 102 26 974 A1 | 1/2004 |
| DE | 103 15 754 A1 | 10/2004 |
| DE | 10 2004 038 877 A1 | 1/2006 |
| EP | 0 874 444 A1 | 10/1998 |
| EP | 1 174 988 A1 | 1/2002 |
| EP | 1 367 698 A2 | 12/2003 |
| EP | 1 793 475 A1 | 6/2007 |
| EP | 1 796 257 A1 | 6/2007 |
| EP | 1 901 416 A2 | 3/2008 |
| GB | 2 438 411 A | 11/2007 |
| JP | 58-224546 A | 12/1983 |
| JP | 60-096147 A | 5/1985 |
| JP | 2005-318745 A | 11/2005 |
| WO | WO 03/001216 A1 | 1/2003 |
| WO | WO 2005/107042 A1 | 11/2005 |

* cited by examiner

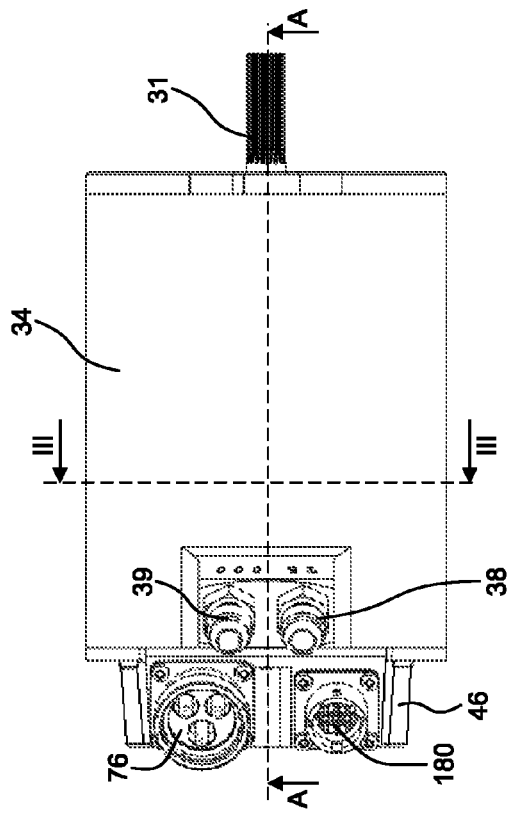
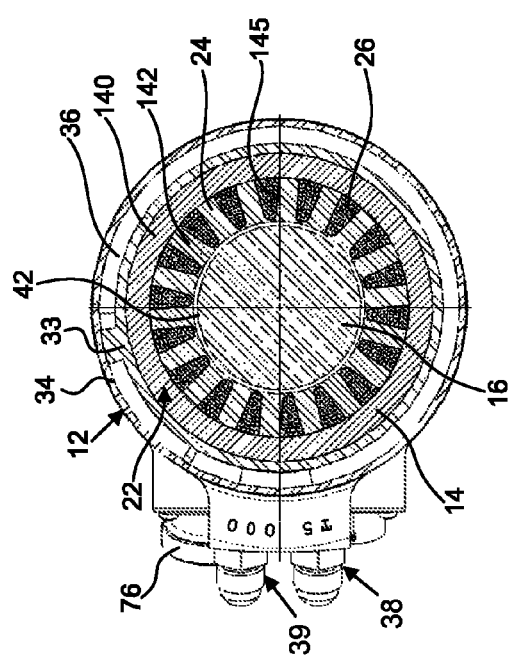
Fig. 2
Fig. 3

CONNECTOR FLANGE FOR AN ELECTRIC MACHINE WITH STATOR WINDINGS

FIELD OF THE INVENTION

The present invention relates to electric machines. It is aimed notably at machines capable of delivering high powers in a very compact format, notably when used as engines, for example in traction applications on board motor vehicles.

RELATED ART

As is known, proposals for electric vehicles have proliferated in recent years. Electric engines whose power can typically reach for example 20, or even 30 kW in a footprint compatible with the interior of a vehicle wheel or its immediate environment, in the case of a vehicle including an electric machine, have been developed. Given the high electrical power delivered by these machines in a restricted space, a fluid circulation-based cooling system is usually provided in the frame of the machine. However, the organisation of the functional members, such as the stator, the rotor and other elements necessary for the driving of the machine, inside the frame remains a key concern for designers of this type of machine.

According to one embodiment known from the prior art, for example from the U.S. Pat. No. 4,908,347, the stator is housed in a sleeve so that the end parts of the later extend axially towards the outside beyond the ends of the stator magnetic circuit constituting the active part of the stator. Windings are housed in the notches. On leaving the notches at each axial end of the magnetic circuit, the conductors of these windings are folded by forming loops to pass from one notch to the next, thus constituting winding heads which are protected in the respective end of the sleeve. On one side of the stator, the ends of the winding conductors intended to be electrically connected with a connector or an appropriate connection module also open. To this end, these ends pass through an opening provided laterally in the wall of the sleeve into a nozzle which projects out of the sleeve in a substantially radial direction towards the outside. Each end part of the sleeve is closed by a cover which completes the frame of the machine. At the centre of each cover there is fixed a sheath which supports a bearing in which is engaged a respective end of the shaft of the rotor of this machine.

In production, the stator is mounted in the sleeve and the plates and the windings are impregnated with resin which reinforces both the cohesion of the assembly and the insulation of the conductive parts. The impregnating resin is admitted from each end of the sleeve and the presence, in the sleeve, of the exit opening for the ends of the conductor windings near the connection nozzle makes this operation fairly delicate if the application of the resin is to be controlled with good accuracy.

The document EP 1 174 988 filed by a company related to the applicants also to describes a synchronous electric machine construction of the same type with a stator housed in a sleeve having emerging axial end parts. On one side of the stator, the connection conductors of the windings exit from the end part of the sleeve through a lateral opening towards a module for their external connection. This same end part is closed by a cover centred on the axis of the rotor which supports a flange element axially offset towards the inside so as to receive a bearing supporting a corresponding end of the rotor shaft. On its extension towards the outside beyond said bearing, this shaft supports the rotor of a resolver that makes it possible to identify at each instant the angular position of the rotor of the machine relative to the stator, in order to provide optimum control of the rotor. This resolver rotor and its associated stator are housed in a space provided between the flange element supporting the abovementioned rotor bearing and the axially internal face of the axial cover for closing the frame.

The duly produced structure is relatively compact. On the other hand, it also has the drawback mentioned with regard to the U.S. Pat. No. 4,908,347 for the resin impregnation operation. Furthermore, since this structure is not modular, for each application of this machine involving a particular arrangement of the electric connections, and consequently requiring provision for their exit from the sleeve, modifications are necessary to the overall construction of the frame and its content.

The U.S. Pat. No. 5,554,900 presents an embodiment in which the central part of the sleeve housing the stator ends axially (on the side of the connection output for the windings) beyond the corresponding axial face of the stator before the lateral exit for the external connection conductors for the coils. It is closed by an end flange the central part of which supports, on a side facing towards the stator, a rolling bearing for the rotor shaft. This shaft passes through the flange and supports, on the other side of the flange, a resolver. The flange is securely attached to a tubular jacket which extends the sleeve by defining a cylindrical housing around the body of the resolver, axially closed by a cover perpendicular to the axis. The connection conductors for the windings originating from the stator pass through the flange into said housing. The lateral wall of the jacket is pierced with an opening that is passed through by these conductors which end, outside of the frame of the machine, in a connection module fixed to the outside of this wall.

This construction may make it possible to overcome the drawback of a modularity defect indicated above, since the jacket and its connection exit for the conductors could be adapted as required according to geometry constraints imposed by different applications of such an electric machine, without the body of the assembly and the sleeve needing to be modified, with equal performance otherwise. However, the construction that has just been described falls down for a lack of compactness, the flexibility of adaptation being obtained at the cost of an axial elongation of the assembly because of the axial juxtaposition of two free spaces on either side of the bearing-supporting flange and an end of the frame. Furthermore, on assembly, the connection of the coils with the outside remains relatively complex.

Another embodiment is described in the US patent application 2007/205679 according to which the outer jacket of the stator of an autopiloted electric machine is extended by a tubular part fixed by attachments to one end of the jacket. In the lateral wall of the part are embedded conductors linking to the outside of the machine. Inside the part, these conductors can be mated with electrical output pins of the coils of the stator. A partition provided with a central opening partly encloses the tubular part in its median part. A seating is formed in the opening of this partition in which is mounted, on the far side of the stator, one of the rolling bearings of the rotor-bearing shaft of the machine. Between this bearing and the stator of the machine, the partition supports the stator of a resolver the rotor of which is fixed to the rotor shaft that has just been mentioned. This arrangement requires a wide separation between the bearings supporting the rotor-supporting shaft which does not favour good resistance to vibrations.

The Japanese patent document JP 60 096147 also illustrates a machine embodiment in which a sleeve surrounding a stator is closed at one end by a kind of lid the axial wall of which has an internal axial bulge in which is secured a support bearing of one of the bearing seatings of the rotor shaft of the machine. The device is organised to allow the conductors from the coils of the stator to exit from this lid in a direction parallel to and not perpendicular to the axis, through said axial enclosing wall of the cover. This device is therefore intended for an organisation of the space around the machine that is of a type quite different from that which is the subject of this document.

SUMMARY OF THE INVENTION

In light of the numerous embodiments reviewed hereinabove, the present invention aims for a construction of an electric machine with stator windings which makes it possible to resolve the notably spatial difficulties currently encountered in the design of both compact and powerful electric machines for multiple industrial applications.

To this end, an embodiment of the invention is an electric machine comprising a stator, a rotor that rotates about an axis inside the stator and a frame enclosing the assembly, and in which: the stator comprises a magnetic circuit with two end faces, passed through, on the one hand, by a cylindrical channel receiving the rotor and, on the other hand, by notches housing winding conductors, the ends of which fold into winding heads at the output of each of said end faces, so as to form coils electrically connected to the outside of the machine by connection conductors at the output of at least one of these end faces; and the frame includes a sleeve laterally enveloping the magnetic circuit between its end faces, and a tubular part which has a lateral wall fixed at one end to said sleeve, on the side of said connection conductor outputs, so as to extend it beyond the corresponding end face of the stator, this lateral wall being pierced with an opening for the exit of said connection conductors for connection outside the frame.

The machine is characterized in that a flange element is attached to said tubular part on the side of its axial end opposite to the sleeve, in that this flange element extends axially from this attachment inside the tubular part towards the end face of the magnetic circuit as far as an axial position close to the axial end of the corresponding winding head, a position where it supports a rotation bearing for the shaft of the rotor, and in that, between its external radial face and the internal radial face of the tubular part, the flange element delimits an annular designed to house an excess length of the connection conductors between the stator and the outside of the machine. Thus, the tubular part with its opening for the exit of the winding conductors towards a connector, external or attached to this part, and the flange element which supports the shaft bearing form a connector flange assembly which makes it possible to provide, as will be seen, in a compact and modular manner, the inside space at the end of the frame of the machine.

It will be noted that, by virtue of this arrangement, it is possible on assembly, before the tubular part has been joined to the sleeve, to gather the connection conductors for the windings outside the body of the stator and fit them into the tubular part towards the opening for connection to the outside. There is then freedom to wind, inside the annular space around the flange element in the tubular part, protected from the rotating parts of the machine, the excess length of the bundle of connecting wires, which is formed when fixing the tubular part to the sleeve of the frame.

In an embodiment of the invention, the internal axial end of said flange penetrates into the input of the space internal to the winding head while leaving an annular communication passage between the radial space internal to the winding head and said annular space around the flange element. This arrangement makes it possible to bring the two bearings of the rotator shaft as close as possible to one another. This is advantageous for the compactness of the assembly, the stability of the rotation of the electric machine and for minimising vibrations. From this arrangement, it is possible to have the annular space created in front of the winding heads flare radially from the axial end of the tubular part and towards the external radial end of the flange element supporting the bearing of the rotor shaft where it offers the maximum of space for housing the output conductors from the coils of the stator.

According to an embodiment of the invention, the internal radial wall of the flange element delimits a space which widens radially in the axial direction from the seating of the bearing of the rotor shaft as far as the external axial end of said tubular part. In accordance with one use, a housing designed to receive the stator of a resolver has been provided in this space between the seating of the bearing for the machine rotor shaft and an opening at the external axial end of said tubular part, designed to provide access to this stator from the external axial end of this tubular part. The internal radial wall of the flange element can then be provided with an opening for communication with the annular space, for the passage of stator conductors from the resolver, which convey angular position information useful to the control of the machine, from said housing towards the outside of this machine.

The invention provides for an advantageous embodiment in which the tubular part constitutes a single-piece part with said internal flange element, which provides both support for the bearing for the rotor shaft and provision for the internal space of this part. It can then be arranged for the internal radial wall of the flange element to delimit a space that widens radially externally from the bearing as for a connection line integral to said flange element at the external axial end of the tubular part. A single-piece embodiment is particularly welcome in the interests of a modularity objective according to which one and the same machine body is used for a given general application category. A series of, possibly single-piece, lids can be developed, each specifically suited to a particular application environment of the machine, for example to each of the models of a motor vehicle platform.

According to another embodiment of the invention, the electric machine comprises a resolver inside said flange element, the rotor of which is fixed to the shaft of the rotor of the machine, on the external axial side relative to the seating of the bearing of the rotor, and the stator is mounted in a housing of said flange element including an opening for access from the external axial end of said tubular part. In a variant embodiment, the flange element has, around said seating of the bearing of the shaft of the rotor, an abutment in the form of a circular crown facing the internal axial side designed to axially immobilise the bearing. A bore is provided at the centre of this crown, the diameter of which is greater than that of the resolver rotor so that, when the rotor is removed from the machine by an axial displacement in the motor stator relative to said bearing, it can bring with it the rotor of the resolver through said bore without disturbing its angular immobilisation relative to the rotor of the machine.

In an embodiment wherein the tubular part which extends the sleeve around the connection conductors, has the general form of a lid with an end face on the external axial side, a central opening opens into the internal radial space of said flange element. This end face may be defined by a wall in the form of a annular crown, of which the external circular edge is attached to the lateral wall of the lid and the internal circular edge is securely attached to the external axial end of said flange element.

Regardless of the particular embodiment of the tubular part or lid, provision is normally made for said housing to be closed by a cover at the axial end of said tubular part. This closure may notably serve to axially immobilise the resolver stator in its operational position after the lid has been closed.

Finally, according to an embodiment of the invention, to allow for the coil connections of the machine to be connected to electrical systems outside the machine, the lateral wall of the tubular part or the lid is topped by at least one nozzle projecting outwards, pierced by a channel which extends a passage opening through said wall for the passage of the conductors from said annular space in the tubular part towards a connector. The lateral wall of the tubular part may have a second opening topped by another nozzle projecting outwards and pierced with a channel for the conductors connecting the resolver stator to exit from the frame.

There is thus obtained a very compact assembly, which is crucial in certain modern applications of these machines, notably as motors for the individual traction of the wheels of a vehicle. The provisions according to the invention also make it possible, while observing the compactness objective, to design modular embodiments, in other words embodiments in which one and the same stator body with its sleeve and its rotor arrangement can be reused for different applications (different vehicle models for example) which require different arrangements with regard to the layout of the connectors or the outside shape of the lid, for example. Finally, the operation for impregnating the stator assembly with a resin which glues the parts into a compact assembly and which contributes to the insulation of the electric parts is greatly facilitated. In practice, the resin, which may typically be admitted into the sleeve from the side of the stator where the conductors linking the coils with the outside of the machine end, may spread around the winding heads and penetrate into the interstices between the plates themselves and the plates and the sleeve, without it being necessary to take any particular precautions with regard to the exit opening for the conductors which, in this construction according to the invention, is located in the lid closing the sleeve.

Other features and advantages of the invention will emerge from the description below with reference to the appended drawings which show, in a non-limiting exemplary manner, embodiments of the subject of the invention.

BRIEF DESCRIPTION OF THE FIGURES

FIG. 2 is a plan view of the machine illustrated in FIG. 1.

FIG. 3 is a view of a stator and a rotor of the machine according to a cross section through a plane III-III of FIG. 2.

DESCRIPTION OF EXEMPLARY
EMBODIMENTS OF THE INVENTION

Figure 1:
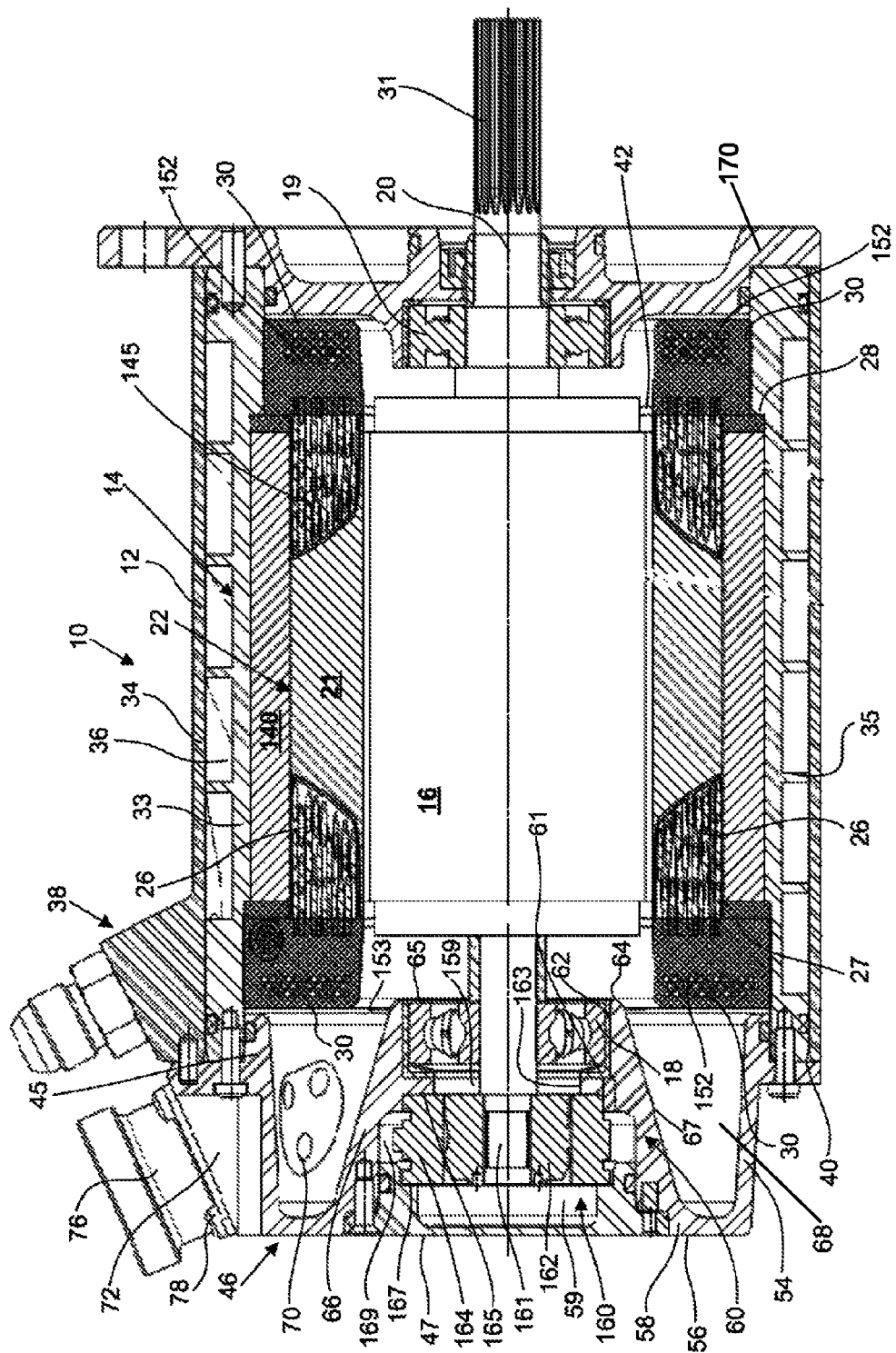
FIG. 1 represents a cross-sectional view through an axial plane of an electric machine according to an embodiment of the invention.

A synchronous electric machine 10 represented in FIG. 1 comprises an external frame 12 inside which are housed a stator 14 and a rotor 16 rotating relative to the stator about an axis 20 inside the stator. The rotor is mounted on a shaft 31 engaged in rolling bearings 18 and 19 securely attached to the frame 12. The stator 14 comprises a magnetic circuit 22 formed by a generally cylindrical stack 21 of magnetic plates 24. The plates 24 of the stack are star-shaped with teeth 142 separated by trapezoidal gaps so as to produce in the stack 21 a series of notches 26 which, without being parallel to the axis 20, run in the stack 21, between one of its axial end faces 27 and its other axial end face 28, while remaining circumscribed within a virtual cylindrical crown.

The cross-sectional view of FIG. 3 clearly shows the notches 26 filled with conductors 145, which flare out between an internal radial end in the vicinity of the air gap 42 and their other radially external end where they are closed by a yoke 140 consisting of a cylindrical stack of plates in the form of circular crowns. The yoke 140 closes the magnetic circuit 22 at the end of each of the teeth 142 of the star-shaped plates 24. The notches 26 house, in a well known manner, the copper conductors 145, folded on leaving each notch to form a loop in order to penetrate into another notch 26 so as to produce three windings or coils designed to be electrically connected in star configuration to a power supply or a three-phase AC consumer device according to an assembly that is also well known for this type of machine. The sets of loops of the winding conductors 145 exiting from the end faces 27 and 28 form "winding heads" 152 impregnated with resin in terminal blocks 30 (FIG. 1).

The magnetic circuit 22 is axially pierced with a cylindrical channel intended to receive, with a calibrated air gap 42 (FIG. 3), the rotor 16 consisting of an assembly of permanent magnets, not represented, and mounted on a shaft 31, the ends of which are each engaged in one of the two bearings 18 and 19 axially spaced on either side of the stator.

The stator 14 is housed in a frame portion forming a sleeve in two coaxial parts. In the internal cylindrical space delimited by the relatively thick wall of a sheath 33 forming the internal part of the sleeve is mounted and immobilised rotation-wise the yoke 140 of the magnetic circuit 22. The external radial face of the wall of the sheath 33 is provided with helical ribs 35 which, together, delimit three walls of a circulation channel 36 for a coolant for the stator body. The fourth face of the channel 36 is closed by an external sheath, or jacket 34, fitted around the sheath 33 (FIG. 3). On the side of one of its ends, the jacket 34 has an opening topped by a hollow nozzle 38, the internal channel of which is linked through said opening to a fluid inlet in the cooling channel 36 provided between the two sheaths 33 and 34 to form a double helix coil on the external cylindrical surface of the channel. The sheath 34 is provided with a second nozzle 39 (FIG. 2) similarly linked to another end of the channel 36 for the evacuation of the coolant.

The windings of the magnetic circuit 22 comprise conductors for connection to the outside, not visible in the figure, which exit the notches 26 at one end of the magnetic circuit 22, situated on the left in FIG. 1 in this example, to be connected to the outside of the machine as explained later. On this same side, the sleeve formed by the joining of the sheaths 33 and 34 ends axially in an annular face 40 perpendicular to the axis 20 in an axial position close to that of the ends of the resin blocks 30. All the basic components of the stator, and only them, are combined inside the sleeve to form a compact assembly which can be impregnated with insulating resin and joined together directly from this end of the sleeve without encountering any chance leakage, or obstacles or inequality all around the output area of the winding heads, likely to oppose the flow and even penetration of the resin or to favour the appearance of inequalities in its shrinkage during polymerisation.

In FIG. 1, the annular end face 40 of this sleeve appears to be formed by the relatively thick end face of the internal sheath 33 radially topped towards the outside by the axial end of the external sheath 34. It is slightly offset axially towards the outside relative to the extreme end of the resin block 30 in which the winding heads 152 are embedded. This offset enables the terminal cylindrical lip 45 of a hollow lid 46, intended to complete the frame of the machine on this side, to fit inside the end wall of the sheath 33.

Figure 4:
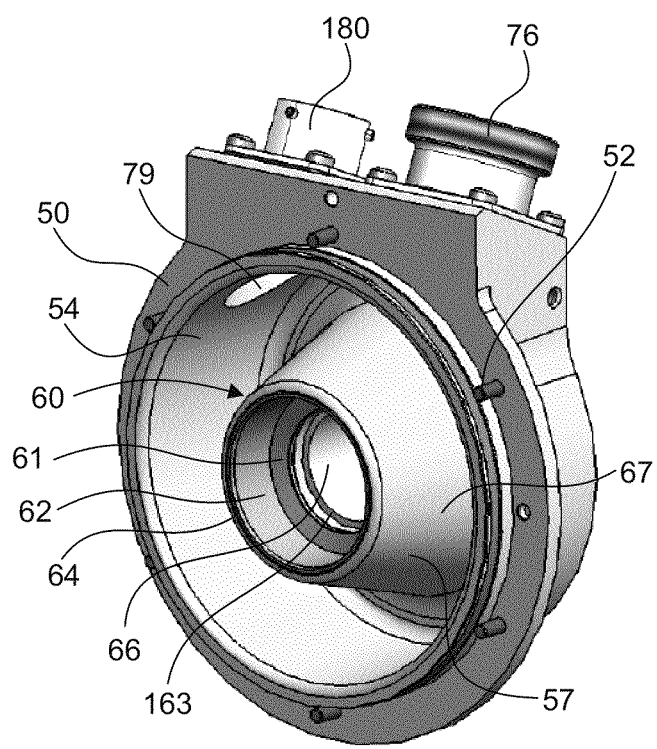
FIG. 4 is a perspective view of an end flange of the machine of FIG. 1, more specifically illustrating an implementation of an embodiment of the invention.

The lip 45 of the lid 46 is topped by a collar 50, clearly visible in FIGS. 1 and 4, which marks the limit of the fitting travel of the lip 45 in the sheath 33. It is provided with holes for screws 52 for axially fixing the lid in the end face 40 of the sleeve. On the side opposite to the lip, the lid 46 has a cylindrical wall 54 which connects the collar 50 to an axial end of the lid, which has a face 56 forming a circular crown around an axial opening which is normally closed by a immovable cover 47 perpendicular to the axis 20. From the internal radial edge 58 of the face 54, the wall of the hollow lid 46 is continued with an axial return towards the inside of the machine which forms a generally tapered flange element 60. The wall of this flange element 60 defines, at its other axial end, a cylindrical seating 62 in which is housed the rolling bearing 18 of the rotor shaft 31 abutted against an annular shoulder 61 (FIG. 4). A bore 163 allows the rotor shaft 31 to pass to the other side of the flange element 60. In the assembly position represented in this example in FIG. 1, the internal axial faces 64, of the part 60, and 65, of the bearing 18 that it supports, is substantially in the same plane normal to the axis 20 as the terminal parts of the resin blocks 30 surrounding the winding heads 152. An annular space 153 between the internal axial end of the flange element 60 and the resin blocks 30 allow free passage of flexible wires for connecting the coils of the magnetic circuit 22 from the output of the notches as far as an exit opening 70 provided in the lid 46 as will be explained hereinbelow.

The wall 66 of the flange element 60 which links its end face 56 to the seating 62 has a tapered external radial face 67 which limits, with the internal radial face of the cylindrical wall 54 of the lid, an axisymmetric revolution housing flared axially towards the inside of the machine. At the periphery of this space, the wall 54 is pierced by two openings, one of which, 70, is clearly visible in FIG. 1, and the other, 79, in FIG. 4. On the external side of the wall 54 is fixed a nozzle 72 pierced with a channel extending the opening 70. The nozzle 72 is topped by an electrical connector 76 secured by screws 78 onto the exit face of the channel outside the nozzle 72.

Thus, on assembly, before the lid 46 is joined to the sheath 33, the flexible conductors for connecting the windings of the inductor exiting the relevant notches 26, are gathered together in a bundle outside the body of the stator, then fitted into the opening 70 of the lid 46 and connected to their respective connection terminals in the connector 76. There is then freedom to wind, in the flared annular space 68 between the walls 54 and 67, the excess length of the bundle of connecting wires, which is formed when the lid 46 and the stator frame are brought together, to apply and screw the collar 50 to the end 40 of the sheath 33.

Returning now to the flange element 60, the internal radial wall of the latter defines a tapered housing flared towards the external axial end of the lid 46, which opens into the opening 59. In this housing is mounted a resolver 160 including a rotor 162 fixed to the end 161 of the shaft 31 of the rotor, on the side of the rolling bearing 18 opposite to the rotor itself, and a stator 164. The resolver stator 164 is immobilised between a shoulder 165 around the bore 163 in the part 60 and a shoulder 167 in the internal axial face of the cover 47 of which the central part has a void at 59 as represented. The cover 47 is secured by screws to the end of the lid 46. The rotor of the resolver 160 is keyed on the shaft 31 of the rotor 16 in a predetermined angular position which serves as a reference for transmitting, at each instant, information concerning the angular position of the rotor in the stator to the system controlling the electric machine, in accordance with the known operating principle of three-phase synchronous machines.

It will be noted that the arrangement described here allows for certain interventions to be made, like maintenance operations for example by removing the shaft 31 from the right-hand part of FIG. 1 where the machine is closed by a flange 170 screwed to the other end face of the frame sleeve 33, 34, which supports the second rolling bearing 19 for the other end of the shaft 31. The removal of the flange frees the right-hand part of the shaft 31. The rotor can then be extracted from the stator bringing with it, on its other end of the shaft 31, not only the rolling bearing 18 which is extracted from the corresponding seating 62 of the flange element 60, but also the rotor 162 of the resolver through the bore 163, the diameter of which is greater than that of the resolver rotor. The operation can be done without destroying the angular keying that exists between the two rotors. This provides for a precious saving in adjustment time on reassembly.

In FIG. 1, it can be seen that the top of the resolver stator 164 is topped by an annular space 169 in the linking part 60 between the two shoulders 165 and 167 which secure it in position. In this space are housed conductors for the coils of the resolver stator, not visible in FIG. 1, of which the connecting wires which convey the useful control information, as just described, exit into the space 169. An opening (not visible) formed in the wall 66 of the flange element 60 at an azimuth close to that of the opening 79 (FIG. 4) can be used to extract the ends of these conductors through this opening 79 in a substantially radial external nozzle, similar to the nozzle 72, topped by an electronic signal connector 180 in proximity to the connector 76 (see FIGS. 2 and 4).

The connector 180 also receives the output line from a temperature sensor, called PTC probe, intended to supply information on the internal temperature of the stator, in order to regulate certain operating parameters of the machine in order to keep the corresponding heating within technically acceptable limits.

The invention is not limited to the examples and embodiments described and represented hereinabove; various modifications can be made there to without departing from its scope defined by the appended claims.

The invention claimed is:

1. An electric machine comprising:
   a machine stator (14);
   a machine rotor (16) positioned on a machine shaft that rotates about an axis (20) inside the machine stator; and
   a frame (12) enclosing an assembly of the machine stator and the machine rotor,
   wherein the machine stator (14) includes a magnetic circuit (22) with two end faces passed through by a cylindrical channel (42) receiving the machine rotor (16) and by notches (26) housing winding conductors (145), the winding conductors including ends that fold into winding heads (152) at output regions of the two end faces (27 and 28), so as to form coils electrically connected to outside of the machine by connection conductors at a connection conductor output of an end face (27) of the two end faces,
   wherein the frame includes a sleeve (33, 34) laterally enveloping the magnetic circuit between the two end faces (27 and 28), and a tubular part (46) that includes a lateral wall (54) having an end fixed to the sleeve, on a side of the connection conductor output, so as to extend the sleeve beyond the end face (27) of the machine stator, the lateral wall being pierced with an opening (70) for electrically connecting the connection conductors outside the frame, wherein a flange element (60) is attached to the tubular part (46) close to an axial end of the tubular part opposite to the sleeve, the flange element (60) extending inside the tubular part from a point of attachment of the flange element to the tubular part towards the end face (27) of the magnetic circuit (22) as far as an axial position close to an axial end of a corresponding winding head, the axial end of the winding head being associated with a position at which a rotation bearing (18) for the machine shaft (31) of the machine rotor is supported, wherein, between an external radial face (67) of the flange element (60) and an internal radial face of the tubular part (46), the flange element (60) delimits an annular space (68) housing an excess length of the connection conductors between the winding head and the outside of the machine, and wherein an internal radial wall of the flange element (60) defines a housing designed to receive a resolver, the internal radial wall including an opening for communication with the annular space (68) for passage of stator conductors from the housing towards the outside of the machine.

2. The electric machine according to claim 1, wherein, in the axial position, an external radial end (64) of the flange element (60) penetrates as far as an input region of a radial space internal to the winding head such that an annular communication passage (153) is located between the radial space internal to the winding head and the annular space (68) around the flange element.

3. The electric machine according to claim 2, wherein the annular space (68) widens radially inward from the point of attachment of the flange element to the tubular part as far as the external radial end (64) of the flange element supporting the bearing (18) for the machine shaft of the machine rotor.

4. The electric machine according to claim 3, wherein the internal radial wall of the flange element widens radially outward in an axial direction from a seating (62) of the bearing for the machine shaft of the machine rotor as far as the point of attachment of the flange element to the tubular part (46).

5. The electric machine according to claim 3, wherein the housing defined by the internal radial wall of the flange element (60) is designed to receive a resolver stator (164) between a seating (62) of the bearing for the machine shaft of the machine rotor and an opening (59) designed to provide access to the resolver stator (164) from the external radial end of the flange element.

6. The electric machine according to claim 5, wherein the tubular part (46) is a single-piece part in which the internal radial wall of the flange element (60) delimits a space that widens radially outward in an axial direction from the bearing (18) as far as the point of attachment of the flange element (60) to the tubular part (46) towards an external axial end (56) of the tubular part.

7. The electric machine according to claim 5, wherein the housing is normally closed by a cover (47) located at the axial end of the tubular part.

8. The electric machine according to claim 5, wherein the lateral wall has a second opening (79) topped by a nozzle (180) projecting outwards and pierced with a channel for conductors connected to the resolver stator (164) to exit from the frame.

9. The electric machine according to claim 1, further comprising a resolver (160) located inside the flange element (60), wherein a resolver rotor (162) is fixed to the machine shaft (31) of the machine rotor (16), on an axially external side relative to a seating of the bearing (18) of the machine rotor, and a stator resolver (164) is mounted in a housing of the flange element, the flange element including an opening (59) for accessing the tubular part (46) from an external axial end of the housing.

10. The electric machine according to claim 9,
wherein the flange element (60) includes, around the seating (62) of the bearing (18) for the machine shaft (31) of the machine rotor, an abutment (61) formed of a circular crown facing an axially internal side, the abutment being designed to axially immobilise the bearing (18) and a bore (163) located at a centre of the crown, and wherein a diameter of the crown is greater than that of the resolver rotor (162) so that the machine rotor (16) can be removed by an axial displacement inside the machine stator relative to the bearing, bringing with the machine rotor the resolver rotor (162) through the bore without disturbing an angular immobilisation of the bearing relative to the machine rotor.

11. The electric machine according to claim 1, wherein the tubular part (46) has a general form of a lid (46) having an end face (56) on an axially external side provided with a central opening into which an internal radial space of the flange element (60) opens.

12. An electric machine according to claim 1, wherein the tubular part (46) has a general form of a lid (46) having an end face defined by a wall (56) formed of an annular crown, annular crown having an external circular edge that is attached to the lateral wall of the tubular part, and the annular crown having an internal circular edge (58) that is securely attached to the external axial end of the flange element (60).

13. The electric machine according to claim 1, wherein the lateral wall (54) of the tubular part (46) is topped by at least one nozzle (72) projecting outwards and pierced with a channel, which extends an opening (70) allowing for passage of the connection conductors from the annular space through the lateral wall.

14. The electric machine according to claim 1, wherein the tubular part (46) constitutes a single-piece part with the flange element (60), the flange element providing support for the bearing for the machine shaft (31), and the flange element providing an internal space of the single-piece part.

* * * * *